G. L. WOODWARD.
AUTOMATIC CHECKER AND TALLY.
APPLICATION FILED AUG. 10, 1915.
1,246,210.
Patented Nov. 13, 1917.
4 SHEETS—SHEET 1.
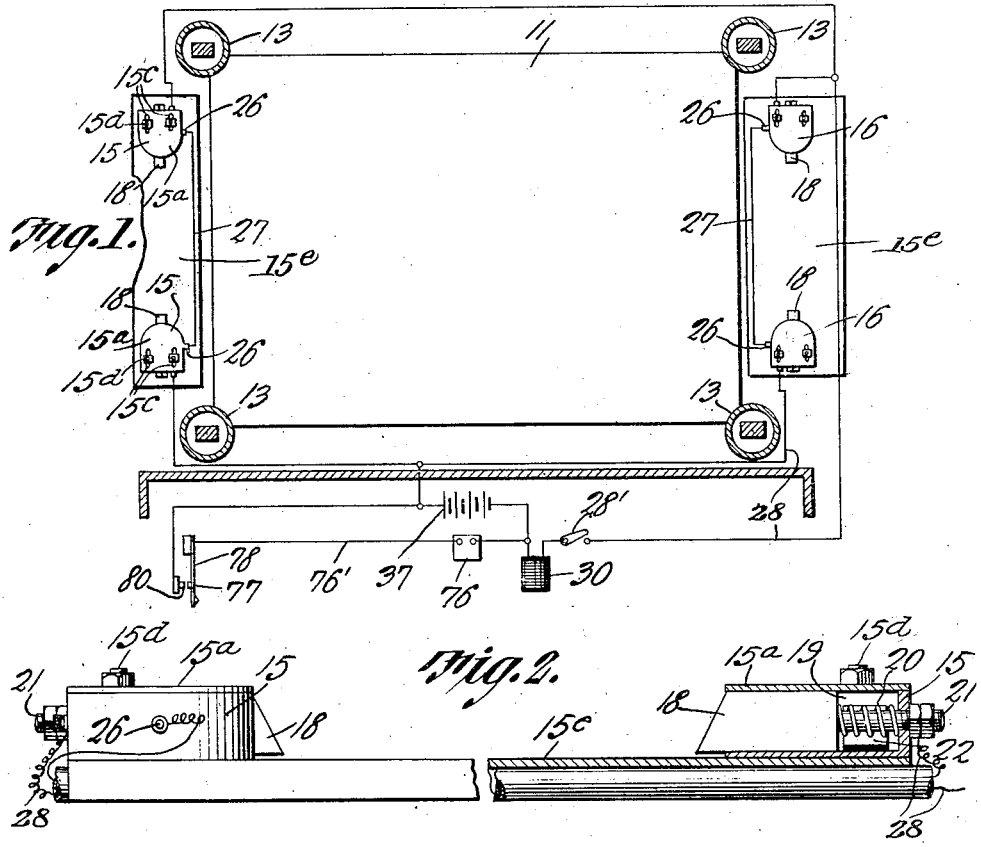
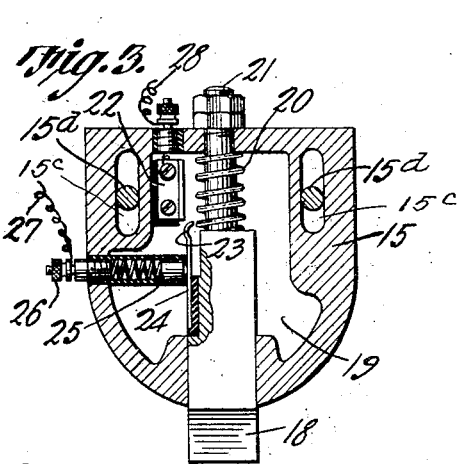
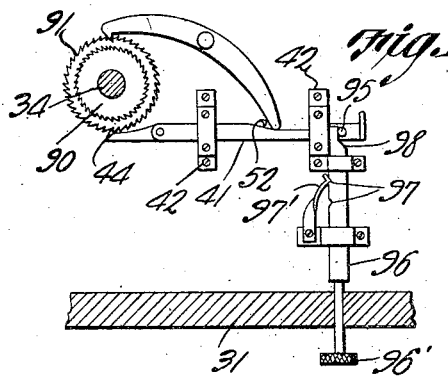
Witnesses
Ed. R. Lusby
Chr. Nielsen, Jr.
Inventor
G. L. Woodward
By H. L. Woodward
Attorney

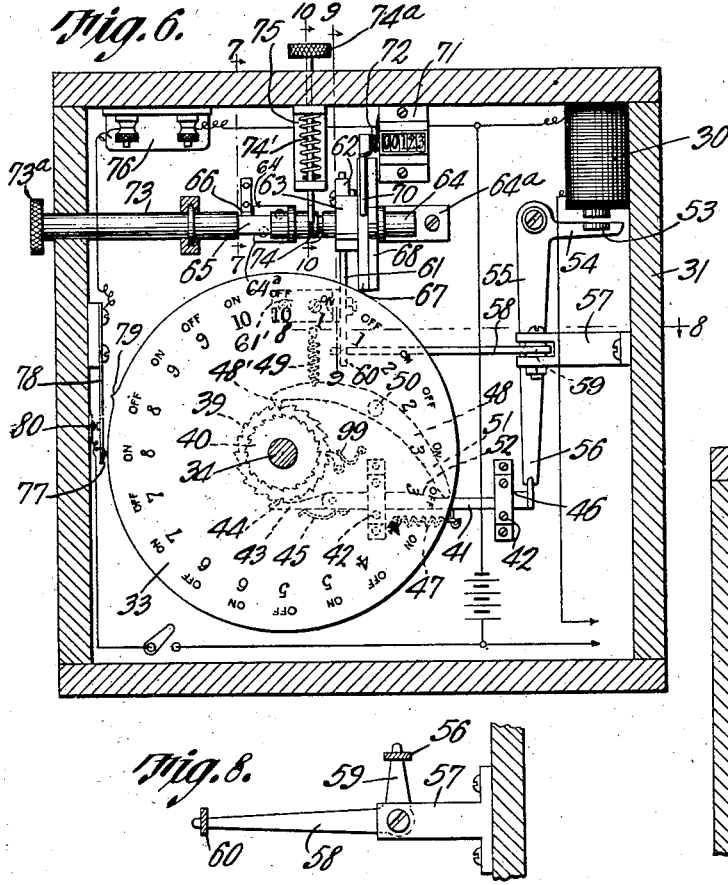
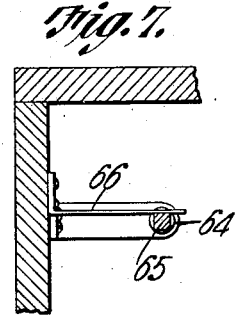
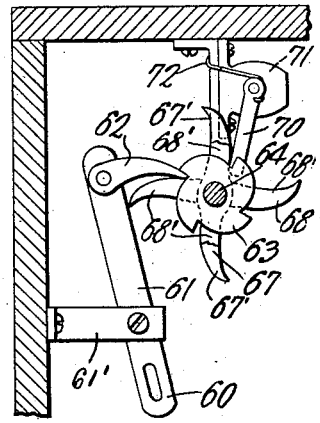
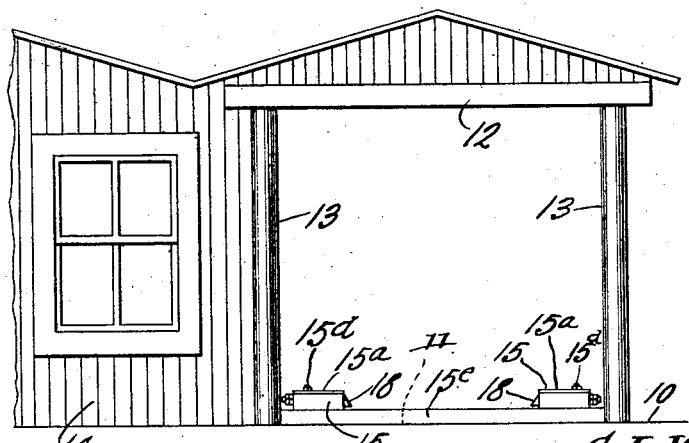
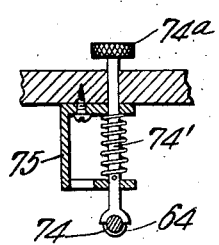

G. L. WOODWARD.
AUTOMATIC CHECKER AND TALLY.
APPLICATION FILED AUG. 10, 1915.
1,246,210.
Patented Nov. 13, 1917.
4 SHEETS—SHEET 3.
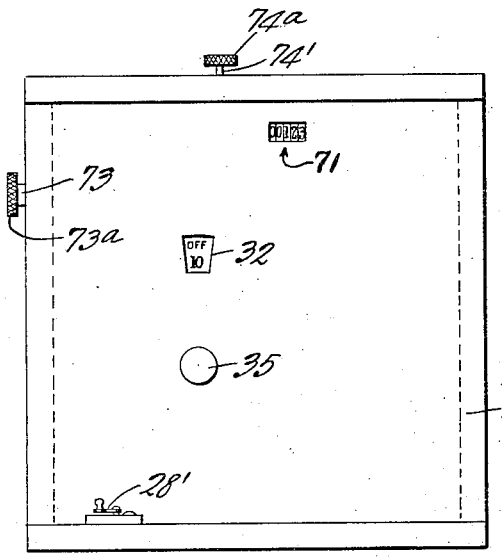
Fig. 5.
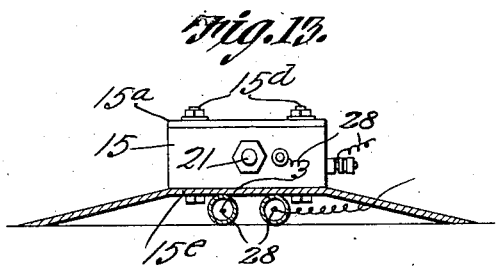
Fig. 13.
Fig. 15.
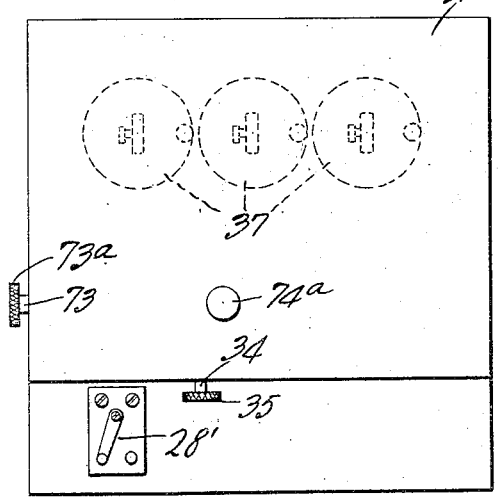
Fig. 11.
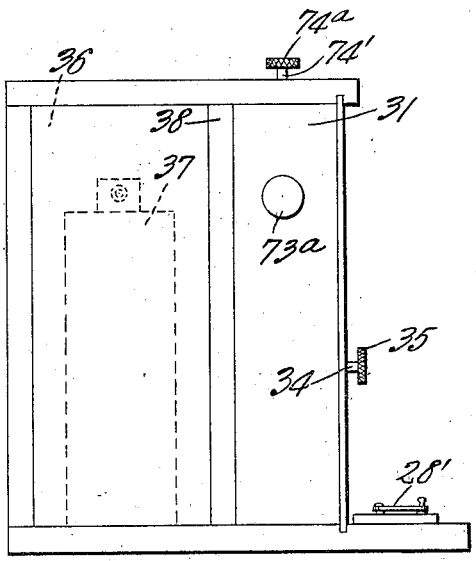
Fig. 12.
Witnesses
Ed. R. Lusby
Chr. Nielsen Jr.
Inventor
G. L. Woodward
By H L Woodward
Attorney

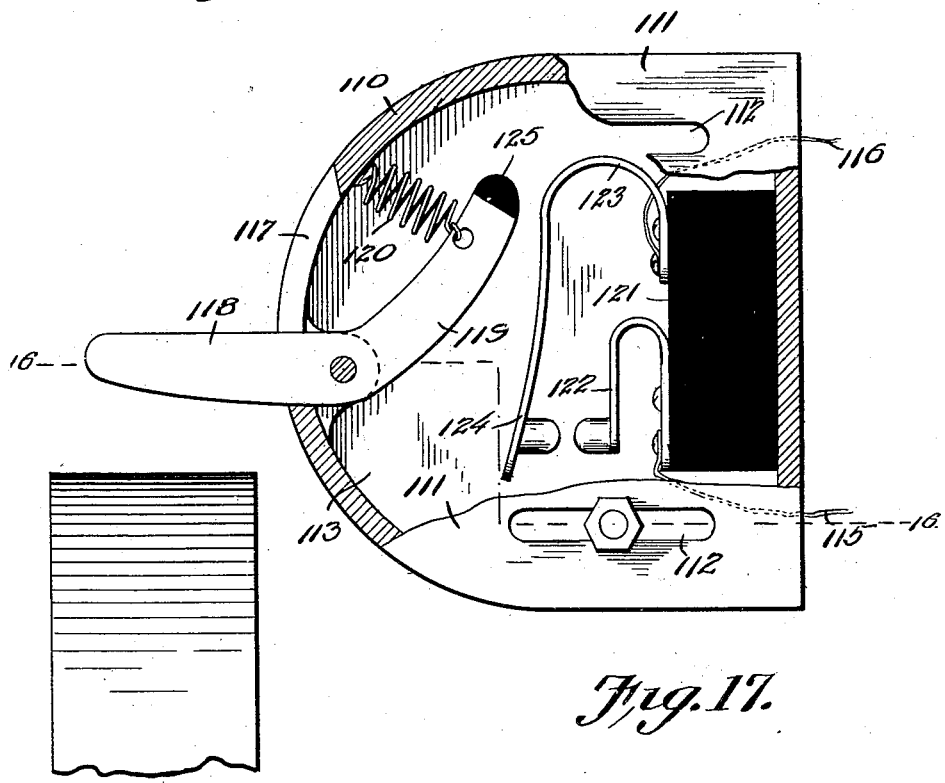

UNITED STATES PATENT OFFICE.

GEORGE L. WOODWARD, OF YONKERS, NEW YORK.

AUTOMATIC CHECKER AND TALLY.

1,246,210.   Specification of Letters Patent.   Patented Nov. 13, 1917.

Application filed August 10, 1915. Serial No. 44,760.

*To all whom it may concern:*

Be it known that I, GEORGE L. WOODWARD, a citizen of the United States, residing at Yonkers, in the county of Westchester and State of New York, have invented certain new and useful Improvements in Automatic Checkers and Tallies, of which the following is a specification.

There are many classes of goods and products which at one or more times between the time of production and use require to be tallied or weighed in parcels of great numbers, such as in the cases of sugar and coffee, it being customary to weigh a number of packages at one time while on a truck in transit from a ship or car to the warehouse, or from the factory to a carrier. Large quantities being handled, the work is conducted very rapidly, and through inadvertences and carelessness, errors frequently occur. It is the purpose of my invention to obviate the possibility of many of these errors, by the construction of an improved tally device or scale control, and while my invention is applicable to use in weighing many products in bulk on trucks of various kinds, I illustrate herein but one embodiment, which is particularly adapted to use in the weighing of sugar by customs officials, and other similar uses and operations. It is adapted to operate in connection with two and four wheel trucks for tallying.

In order that the utility of my invention may be understood, I will explain the *modus operandi* now practised in weighing sugar under custom house supervision upon platform scales in which I have had extended experience. The sugar is imported in burlap bags containing an average of 320 pounds each, and is loaded at the hatch or "stool" on to hand trucks of the familiar two-wheeled type generally used in warehouses, three bags to the "draft" or truck load, and conveyed by Government laborers to an electrically operated automatic balancing and recording scale, where it is weighed by an official of the government. It is then weighed again subsequently by the merchant. The scale mentioned is caused to operate by the manipulation of a lever which is manipulated by the weigher after a truck has been positioned upon the platform of the scale. Working in this way, the bags are weighed at the rate of five or more drafts per minute, at times, and in such rapid work inadvertences may easily occur. When the "drafts" are being so rapidly handled, a workman will occasionally leave the truck on the scale somewhat longer than customary and the weigher will suppose a new draft is in place and weigh the same one twice, or sometimes the drafts follow so quickly that a new draft will be confused with one already weighed and be passed without weighing. Such errors are especially liable because of the fact that the weigher is required to observe the operation of the scale and enter the weights on a record sheet and perform other mental operations besides those connected with observing the handling of the sugar. It has been customary to guard against such errors in a measure by having the successive truck loads marked with chalk on the bags by a laborer stationed at a suitable point numbering the drafts from one to ten in order, and repeat, grouping the spaces for entering the records of weights similarly, and by entering in the book opposite the weight, the number of the truck; but the laborer sometimes forgets the last number marked and either gains or loses one or more numbers, and the weigher neglects to note the number of the truck, and when the discrepancy between the numbers on the bags and the spaces for the entries in the record book is discovered, it can not be determined whether the weigher or the marker is at fault. My invention will obviate the necessity for such check labor, but will still permit the adding of the weights of the drafts in aggregates of ten, checked by the record made by the weighing machine. My invention also includes means guarding the weigher against entering the weight of the same draft twice in the record sheet through inadvertence. In addition to meeting these requirements, it is an object of the invention to provide an efficient means for recording the entry and departure of the trucks from the scale. Also, to give an improved device for indicating the order and stage of movement of each truck passing the weigher: that is to say, indicating whether it is newly entered since the last record, or is due to depart.

I also aim to provide means to give a total register of the number of drafts passing a given point or over a certain scale during any predetermined period.

Additional objects and advantages will be apparent from the following description and from the drawings, or otherwise.

Figure 1 in the illustrations is a top plan of a scale equipped with my invention, Fig. 2 is an elevation of one of the contact devices, partly in section, Fig. 3 is a detail plan of one of the buffer elements partly in section, Fig. 4 is an elevation of the scale and my invention.

Fig. 5 is a front elevation of the indicator.

Fig. 6 is a similar view thereof with the front cover removed, the wiring circuit being diagrammatic.

Fig. 7 is a detail section on the line 7—7 of Fig. 6.

Fig. 8 is a detail section on the line 8—8 of Fig. 6.

Fig. 9 is a detail section on the line 9—9 of Fig. 6.

Fig. 10 is a detail section on the line 10—10 of Fig. 6.

Fig. 11 is a plan of the indicator box,

Fig. 12 is a side elevation of the indicator box.

Fig. 13 is a cross section of mounting of the buffers.

Fig. 14 is a detail of the modified construction of the dial connections,

Fig. 15 is a detail view of a modification of the register operating device.

Fig. 16 is a detail cross section of a possible construction of buffer.

Fig. 17 is a top view thereof with the cover plate removed.

There is illustrated in Fig. 4 a portion of a warehouse floor 10, in and flush with which there is set the oblong rectangular platform 11 of a scale of any suitable type, it being understood that my invention is applicable to manually operated scales as well as those in which the movement of the poise and other functions is accomplished mechanically. On this account, the details of construction of the scale mechanism will not be illustrated. In one type of scale for weighing sugar it is customary to support a scale cover 12 on four stanchions 13 at the side of which is built a small scale house 14 to accommodate the beam and electrical means for operating the poise and a recording mechanism, set in operation by means of a suitable hand lever. My invention in the present instance includes two buffer posts 15 closely adjacent one end of the platform upon the floor 10, the posts being separated from each other just sufficiently to allow the wheels of a hand truck to pass simultaneously therebetween as the truck is wheeled upon the platform. The platform is preferably wider than the truck so that any projecting portions of bags dragging will be supported by the platform. These buffers are cast housings, U-shaped in horizontal section and provided with top plates 15$^a$, formed with longitudinal slots 15$^c$ through which bolts 15$^d$ are engaged with the floor plate 15$^e$ by which the housings are carried. The buffers may be secured directly to the floor if desired, but for ease of installation especially if the device is not originally built in, I have provided the floor plate 15$^e$ (Figs. 2 and 13) to which the buffers are attached, and which plate may be easily secured in any customary manner. The plate 15$^e$ is raised slightly on a line centrally between the buffers to permit passage under the plate, if desired, the opposite side portions of the plate being very gradually inclined from the edges (Fig. 13). The buffers have their rounded ends presented toward each other. Two similar buffers 16 are mounted at the opposite side of the platform in similar relation thereto and to each other. A truck will thus be guided easily between the buffers in approaching and departing from the scale. In each buffer at its side nearest the adjacent buffer there is mounted a sliding latch bolt or contact maker 18 set at right angles to the path of trucks between the buffers, and projecting into the path of their wheels, being beveled on the upper side so that when borne upon by a passing wheel the bolt will be forced inward into the passage 19 in the buffer against the action of a spring 20 compressed behind the bolt. A threaded stem 21 is projected longitudinally from the inner end of the bolt engaged slidably through the inner end of the buffer, and a nut engaged on its end outside the housing, the spring being coiled around the stem. To one side of the bolt there is an insulated contact plate 22, and on the adjacent side of the bolt a brush 23 adapted to engage the contact when the bolt is moved inward a distance. A contact face 24 is formed on the forward and outer body of the brush, with which there engages an insulated brush 25 carried by the buffer body and engaging the face 24 throughout the movement of the bolt so that a circuit may be completed therethrough, terminals 26 being engaged with the brush 25 and plate 22. The brushes 25 of each pair of buffers are bridged as at 27 in the diagram of the circuits in Fig. 1. The plates 22 form the terminals of an open circuit 28 normally open at the break between the brush 23 and plate 22, connected in series with an electrical source, as a battery 37, and the electro-magnet or solenoid 30 of an indicator 31 now to be described. A switch 28' is incorporated in this circuit by which operation of the indicator may be stopped when desired.

The indicator comprises a housing 31, having an opening 32 in the front through which may be viewed ordinals on a rotating dial 33 carried by a shaft 34, one end of which projects through the front of the housing and is provided with a resetting knob 35. The housing may include a compartment 36 in which the battery 37 is located by which the circuit from the buffer contacts is energized. This compartment is formed by a plate 38 centrally of the housing, which may be utilized with the front of the housing to support the shaft 34. Back of the dial two ratchet wheels 39 and 40 are fixed upon the shaft both having the same number of teeth but those of one being inclined oppositely to those of the other. A horizontal bar 41 is slidably mounted in brackets 42 on the plate 38 movable in a path approximately tangent to the perimeter of the ratchet 39, which is the larger of the two, although this is not material. A dog 43 is pivoted on the end of the bar 41 having a tooth 44 presented toward and shaped for engagement with the ratchet to rotate the shaft 34 under reciprocation of the bar 41, and being yieldably held against the ratchet by the leaf spring 45 on the bar. The bar 41 is formed with a shoulder 46 engaging one of the brackets 42 at the limit of its movement toward the ratchet, in which position it is yieldably held by a spring 47 attached to the bar and to the plate 38. A detent 48 is mounted on the plate 38 having a bill 48' disposed to engage the ratchet 40 when moved into engagement therewith, but normally held just out of engagement by a spring 49 engaged therewith near the bill, the detent being pivoted on a pintle 50 and having an arm 51 extended diagonally into engagement with the side of the bar 41 by which its outward movement by the spring is checked. The bar is formed with an inclined face 52 arranged to engage the detent arm by outward movement from the ratchets, so that the bill 48' is moved inwardly and will engage the first tooth of the ratchet 40 approaching, by which the ratchets will only be moved the distance of one tooth thereon under each reciprocation of the bar 41. Reverse action of the ratchet 39 is prevented by the check pawl 99.

The magnet or solenoid 30 is mounted at the upper side of the housing 31 and has associated therewith the armature bar 53, carried on the short arm 54 of a bell crank lever 55, the pendant long arm 56 of which is connected at its extremity with the bar 41, so that attraction of the armature will cause outward sliding movement of the shaft. Upon a suitable bracket 57 a second bell crank lever 58 is pivoted for horizontal movement, having a short arm 59 connected intermediately of the arm 56, its longer end having a reduced extremity inserted slidably in a slotted short arm 60 of a lever 61 upon a suitable bracket 61' the upper long arm of which is provided with a pivoted pawl 62 disposed in engagement with a four-tooth ratchet 63 carried by a revolubly and slidably mounted shaft 64 located in the upper part of the housing 31. This shaft is carried in suitable brackets 64ª, secured to the plate 38, and is formed with an outer polygonal element 65 upon which a leaf spring 66 bears to limit its movement to certain positions under engagement of the ratchet and pawl. Fixed on the shaft 64 there are two multiple cams 67 and 68 respectively, the one having two cam arms 67' and the other having four similar arms 68', the latter cam being close adjacent the adjacent bracket 64ª at one limit of the sliding movement of the shaft 64. Disposed over the cam 67 while the shaft is in this position there is an operating lever 70 of a register or counter 71, the lever being engaged by a suitable spring 72 holding it in initial position for engagement by the arms of the cam under rotation, the arms being of a length to give sufficient movement to the lever to operate the register. The cams are close against each other, and the two arms of the cam 67 are diametrically opposite each other and alined with two arms of the cam 68. The shaft may be moved longitudinally for adjustment of the cam 68 in engagement with the lever by means of a coaxial rod 73 loosely connected to one end of the shaft to permit free rotation of the shaft and rod relatively, the rod being extended through the side of the casing and having a knob 73ª thereon for its manipulation. In order to hold the shaft releasably at the position desired, peripheral grooves 74 are formed therein spaced to correspond with the spacing of the medial planes of the cams, engaged in one of which there is a forked inner end of a sliding spring-pressed pin 74 engaging snugly in the groove, being carried in a suitable bracket 75 on the top of the housing 31 and having a knob 74ª on its upper end without the housing.

A buzzer 76 is mounted on the indicator in an individual open circuit 76' with the battery 37 including the circuit closer 77, mounted on the side of the housing 31 adjacent the periphery of the dial 33. This closer comprises a suitably mounted wiper spring 78 bearing at its outer part against the edge of the dial, which may be made of a suitable material for the purpose, and is provided with a projection 79 at one point whereby the spring will be borne toward a contact 80 mounted thereunder, to which suitable connections are made in the circuit mentioned, similar connections being made with the spring 78 whereby the circuit will be closed when the spring is engaged by the projection 79 of the dial, and the buzzer sounded.

On the dial, in position to be viewed through the opening 32 one unit at a time, there is marked a scale of twenty units reading as follows:—"On—1, Off—1, On—2, Off—2, On—3, Off—3," and so on, until "Off—10" is reached which is the zero of the scale, and immediately following the last named unit there is the first unit above mentioned. The projection 79 on the edge of the dial is located so as to close the circuit to the buzzer as the said first unit appears under the opening 32.

It will be seen that when the hand truck passes upon the scale platform from either side, the circuit through the magnet will be closed causing the rotation of the dial one unit and indicating "On," the device being previously properly set, and upon removal of the truck, from either side, the dial will similarly be moved to indicate "Off," and the number of the draft. In this way there need be no uncertainty whether the weigher is entering the weight of the proper draft, for the number of, and the draft to be entered will be displayed, and the weigher need only be certain that he is entering the record in the division of his book corresponding to the number on the indicator. No repetition will occur, and the only way an omission of a record can occur is by failure to attend the display of the weights and enter them, which is not so much an inadvertence—by which errors might heretofore have been excused—as a laxity in the performance of duty, which cannot be mechanically prevented, although it will be indicated.

At the same time a complete tally of the number of drafts passing is kept by the register.

In case four wheel trucks are used when weighing, ratchets 90 and 91 having double the number of teeth may be mounted on the dial shaft in place of, and having similar functions to those numbered 39 and 40 before described, the divisions on the dial being left the same. At the same time, if the ratchets 90—91 are of the same diameter, the movement permitted to the lever 61 will be but half that resulting from the use of the ratchets 39—40, a ratchet 63 having double the number of teeth should be used. When the lever 61 operates with a full stroke the pawl 62 will engage every second tooth of the ratchet. These details are illustrated in Figs. 14 and 15. If desired, the forty-tooth ratchets may be permanently fixed on the dial shaft, and the stroke of the bar 41 varied to correspond with the type of truck. Thus in Fig. 14 the bar 41 and its associated parts are the same as before described, except that the forty-tooth ratchets are shown, and in addition a pin 95 is fixed thereon outward of the outermost bracket 42 which pin rests against the vertical sliding bar 96 projected through the bottom of the housing 31 and provided with a knob 96'. The bar has two longitudinally spaced notches 97 in one side in which there engages alternately the keeper spring 97' by which it is held yieldably at either limit of its movement. The bar is broadened a short distance from its upper end an inclined edge 98 extending from the narrower to the broader part. With the pin 95 engaged against the reduced upper part of the bar 96 the bar 41 is permitted its full stroke, while by pressing the bar 96 upwardly the bar 41 will be permitted to return only far enough for the dog tooth 44 to pass one tooth of the ratchet 90 after being checked by the engagement of the detent with the ratchet 91. It will be observed that with the bar 96 in the first position the bar 41 accomplishes about half its operative movement before the detent is engaged by the inclined face 52 on the bar 41, consequently allowing one tooth of the ratchet 91 to pass clear of the detent.

The operation of the device in connection with the weighing of four-wheel truck drafts will be readily understood, each truck causing two impulses to be communicated to the magnet of the indicator when passing each set of buffers, and with the bar 96 at the upper limit of its movement the first two impulses will move the indicator to expose an "On" unit of the dial and rotate the shaft 64 a quarter turn. The succeeding two impulses will cause an "Off" unit to be exposed on the dial, and, the shaft 64 being adjusted with the cam 67 alined with the lever 70, the resultant second quarter turn of the shaft 64 will cause one of the arms 67 to operate the lever 70 to register passage of one draft.

The device is adaptable to use as a simple tally or register of passing trucks, as will be readily understood, and one of the floor plates before mentioned, with the buffers thereon may be located at any convenient point for the passage of trucks thereover, and the shaft 64 shifted to bring the cam 68 into alinement with the lever 70, so that each closure of the circuit with the bar 96 at the lower limit of its movement will cause operation of the register. This would be the action where two wheel trucks are involved. For four wheel trucks the bar 96 would be raised, so that each second impulse would then register one draft.

When used in connection with the scale and with the cam 67 in operative relation to the lever 70 the register will operate as each second unit of the dial is exposed, while when used as a tally, the register will operate as each unit is exposed on the dial.

The operation of the buzzer as each tenth draft comes upon the scale is useful in keeping the weigher's attention on the proper sequence of the entries in the record, which, as before stated are grouped in units of ten. This prevents errors which might occur if strict attention is not given to the indicator.

It will be appreciated that setting of the cams 67 and 68 is accomplished by raising the knob 74ª and pushing or pulling the knob 73ª in or out, for use with two or one set of buffers, as the case may be, the release of the upper knob causing the locking of the shaft 64 to hold the cams as set.

Should by any accident, a draft be removed from the scale before the completion of the weighing operation, as sometimes occurs, the switch 28' may be opened and the truck returned to the scale while the operation is completed, the switch being closed after the second departure of the truck. This switch also enables the testing of the scale and determination of tare without registering drafts.

The bolts 18 may be located directly upon the scale platform, although I consider it preferable to locate them immediately adjacent thereto, for simplicity in the mechanical construction and installation.

Numerous other embodiments of the invention are possible, and it will be appreciated that it is applicable to use on many other kinds of scales besides that indicated.

In Figs. 16 and 17 there is illustrated a modification of the buffer construction and contact, in which a U-shaped casing 110 is provided having a top 111 formed with longitudinal slots 112 therein adjacent the sides. The base of the U-shaped member is closed by means of a plate 113, having notches 114 at the lower edge through which are led the wires 115 and 116. The bights of the U-shaped member is slotted as at 117, and pivoted suitably immediately inward of this slot there is a strike lever 118, projecting normally from the buffer longitudinally thereof, and having an inner arm 119 extending at an oblique angle thereto toward one side of the U-shaped member, to which a spring 120 is attached, secured to the side of the housing, by which the lever is held in extended position, striking against the inner end of the slot 117, which is disposed more on one side of the U-shaped member than on the other. Carried by the plate 113 there is an insulating block 121, upon which there is secured a spring contact 122, located closely adjacent the slot, and having the wire 115 connected thereto. A second and much larger spring contact 123 is also mounted on the block, with a long arm 124 projecting into the path of the arm 119 of the strike lever, so as to be struck by the arm under oscillation of the lever against the tension of the spring 120. The extremity of the arm 119 may be provided with an insulated wiper portion 125, of any suitable character. It will be seen that shortly after oscillating movement of the lever begins from initial position the wiper element will engage the arm 124, bearing the contact 123 into engagement with the contact 122, and the resilient nature of the arm 124 will permit it to yield under continued movement of the arm 119, without liability of damage, this end being also facilitated by the yielding character of the contact 122. Thus the contact is maintained until the lever is released and returned to initial position by the spring 120.

In the present handling of sugar to which my device is here specifically adapted, each truck load is termed a "draft." For want of a better term, therefore, it is used in the claims to indicate a unit moving body or group of bodies, whether drawn or pushed, and to include as well a container or carrier empty, as will as a package moving by itself, except where specifically indicated otherwise.

What is claimed:

1. In a device of the character described, a plurality of draft controlled switch elements in transverse groups spaced longitudinally of a given path for separate successive operation of each group, a circuit adapted to be closed by the switch elements when simultaneously engaged, and means electrically connected therewith to indicate the stage of progress of an engaging truck with respect to the switch elements.

2. In a device of the character described, a pair of buffers located at opposite sides of a given path for guidance of draft elements located in and on a line at right angles to the path of the draft passing between the buffers, constructed arranged and adapted to be operated thereby for closing a circuit, a circuit connected therewith to be closed when the switch elements are simultaneously engaged, and an indicator means in the circuit.

3. In a machine of the class described, an indicator having elements indicating alternately arrival and departure of trucks, truck-operated means to actuate the indicator, including a variable stroke element and means to vary its stroke, whereby two and four wheel trucks will produce like movement of the indicator.

4. A device for recording truck movements upon a floor comprising a casing adapted to be mounted upon a floor, a movable member projected therefrom adapted to lie over an adjacent floor portion and yieldable to a truck wheel moving in a predetermined relation to the device, an indicator and indicator actuating means operatively associated with the said movable member.

5. In a device of the character described, two draft engaging elements located in and on a line at right angles to a predetermined path an indicator and series operative connections between the indicator and first named elements, whereby operation of the first named elements by drafts not moving in the said path will not operate the indicator.

6. The combination of a scale, a plurality of draft actuated control devices at opposite sides thereof, those at each side being arranged on a line at right angles to a path leading to or from the scale, an indicator and operative connections between the control devices and the indicator.

In testimony whereof I affix my signature in presence of two witnesses.

GEORGE L. WOODWARD.

Witnesses:
JOHN J. MCARDLE,
C. W. B. BURKHARDT.

Copies of this patent may be obtained for five cents each, by addressing the "Commissioner of Patents, Washington, D. C."